(12) United States Patent
Gavillucci

(10) Patent No.: US 6,843,149 B2
(45) Date of Patent: Jan. 18, 2005

(54) SEQUENTIAL FOUR-SPEED SHIFTER

(76) Inventor: Renato Gavillucci, 316 Stephensons Road, Mount Waverley, 3149, Victoria (AU)

( * ) Notice: Subject to any disclaimer, the term of this patent is extended or adjusted under 35 U.S.C. 154(b) by 127 days.

(21) Appl. No.: 10/261,556

(22) Filed: Sep. 30, 2002

(65) Prior Publication Data

US 2004/0060381 A1 Apr. 1, 2004

(51) Int. Cl.$^7$ .............................................. B60K 20/00
(52) U.S. Cl. ................................. 74/473.21; 74/473.25
(58) Field of Search .............................. 74/469, 471 R, 74/473.1, 473.21, 473.24, 473.25

(56) References Cited

U.S. PATENT DOCUMENTS

| | | | |
|---|---|---|---|
| 3,765,261 A | * 10/1973 | Hobbins | 74/473.21 |
| 4,370,897 A | * 2/1983 | Carlo | 74/473.28 |
| 5,163,635 A | * 11/1992 | Sato | 242/261 |
| 5,768,945 A | * 6/1998 | Ose | 74/489 |
| 5,921,138 A | * 7/1999 | Kojima et al. | 74/473.13 |
| 6,308,797 B1 | * 10/2001 | Hacker et al. | 180/230 |
| 6,487,927 B1 | * 12/2002 | Sputhe | 74/473.23 |
| 2001/0042421 A1 | * 11/2001 | Feng et al. | 74/502.2 |
| 2003/0047020 A1 | * 3/2003 | Ikeya | 74/473.1 |

FOREIGN PATENT DOCUMENTS

WO   WO 01/59335 A1 * 8/2001

* cited by examiner

Primary Examiner—David M. Fenstermacher
(74) Attorney, Agent, or Firm—Smith-Hill and Bedell

(57) ABSTRACT

A mechanical gear shifting mechanism capable of connection to a gearbox includes a shifter frame and a rotatable shaft mounted to the shifter frame. A ratchet drum having teeth is fixed to the shaft. A first cam disc formed with a slot in its main face is fixed to the shaft for rotation therewith. A shifting lever is connected to the shifter frame and is pivotable about an axis in first and second directions. First and second engagement pawls are connected to the shifting lever and positioned for engaging the teeth of the ratchet drum, whereby pivotal movement of the shifting lever induces rotational movement about the shaft's longitudinal axis. A pendant lever is engaged with the slot via a follower and has an end engageable to the gearbox. In practice, the end of the pendant lever would be connected to gear selectors of the gearbox.

17 Claims, 7 Drawing Sheets

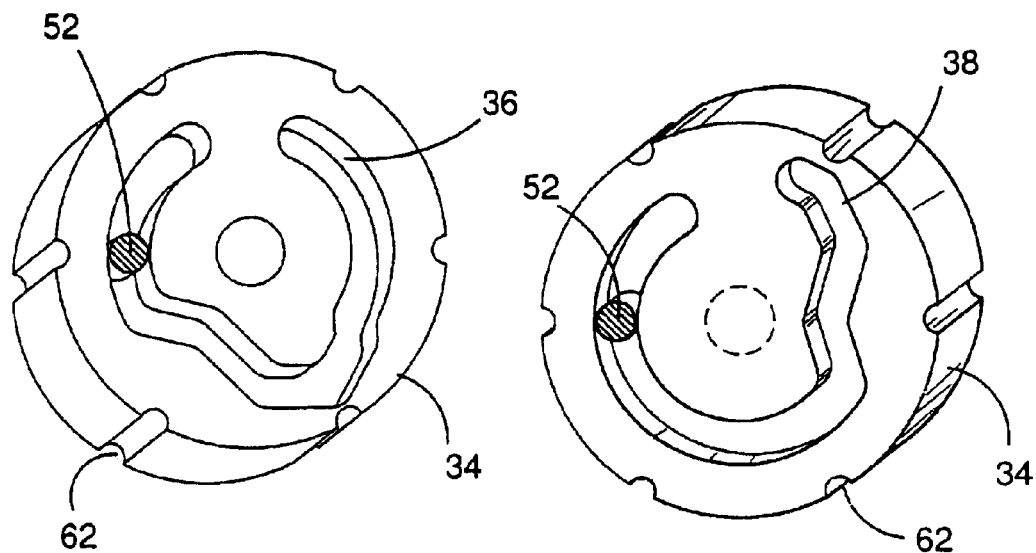
FIGURE 7  FIGURE 8
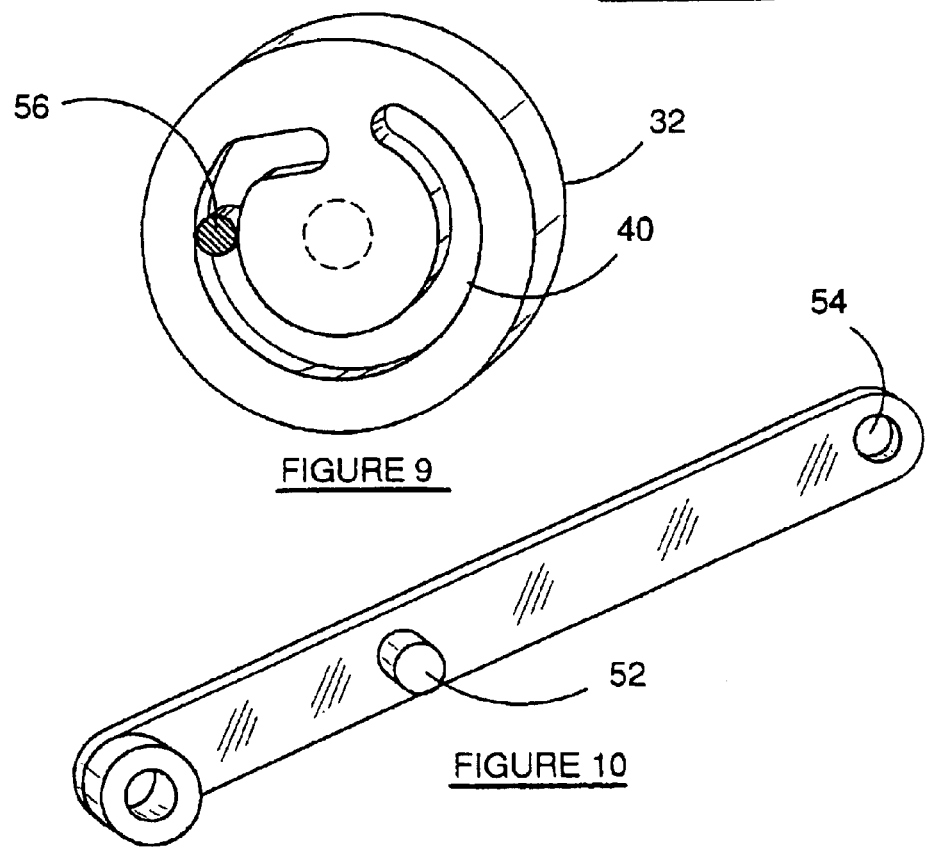
FIGURE 9
FIGURE 10

SEQUENTIAL FOUR-SPEED SHIFTER

FIELD OF THE INVENTION

This invention concerns gear shifts for gear boxes.

BACKGROUND OF THE INVENTION

It is common for road vehicles, such as private cars and commercial vehicles, to have four forward speeds, neutral and reverse speeds arranged for operation with an H-gate. Engagement of reverse gear requires extra lateral selection motion outside the H, as does the selection of overdrive for cruising. Some drivers prefer straight motion selection.

SUMMARY OF THE INVENTION

This invention provides a manual gear shift for connection to selectors in a gear train, comprising means for converting uniplanar movements of a gear lever into rotary motion, one or more disc cams arranged to be turned by the rotary motion and a follower for the or each cam adapted to produce to and fro movement capable of linkage to a gear train selector.

PREFERRED ASPECTS OF THE INVENTION

The means for converting the gear lever movement into rotary motion is ratchet driven by a pair of pawls linked to a crank projecting from the gear lever. The disc cams and the ratchet may be on a common shaft. The gear levers may be disposed on both faces of a common cam, each lever having a pin engaging the cam face.

BRIEF DESCRIPTION OF THE DRAWINGS

One embodiment is now described with reference to the accompanying drawings, in which:

FIGS. 7, 8 and 9 are perspective views of the cams.

FIG. 10 is a perspective view of a lever.

DETAILED DESCRIPTION WITH RESPECT TO THE DRAWINGS

Figure 1:
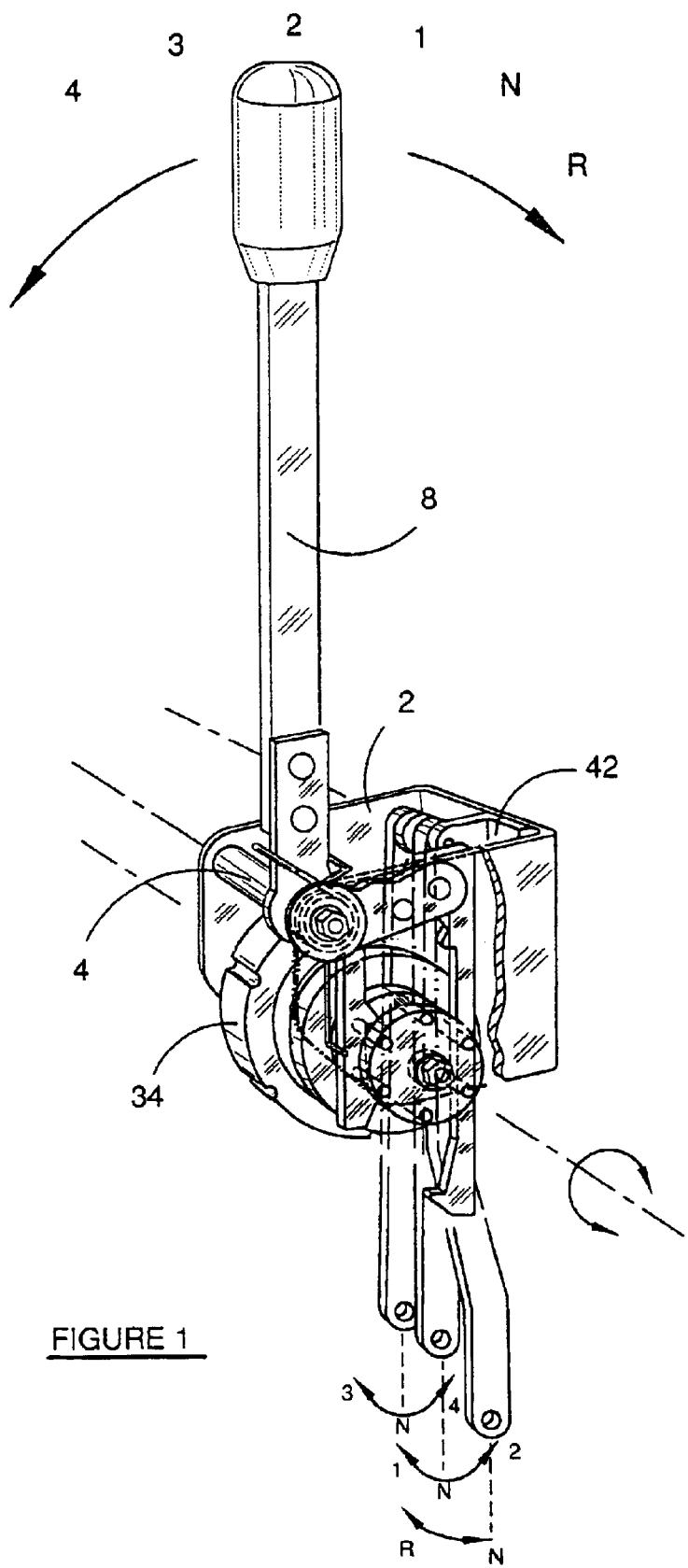
FIG. 1 is a perspective showing the general layout.

Referring to FIG. 1, the channel section body 2 has bolt holes for connection by brackets (not shown to the gear box). Axle 4 mounts bell crank 6, one arm of which is the gear lever itself 8. Crank 6 mounts a pair of pins 10, 12 from which depend a pair of pawls 14, 16. Pawl 14 has paired hooks separated by a short gap 18. Pawl 16 is longer and has paired hooks separated by a long gap 20.

Axle 22 supports a ratchet assembly consisting of a drum 24 with six transverse rods 26 arranged at 60° intervals around the drum. Pawls 14 and 16 are urged into contact by rat trap springs 28, 30. Actuation of the gear lever and attached bell crank drives the ratchet assembly clockwise in 60° steps and then anticlockwise in five 60° steps, ie. gears 1, 2, 3, 4, NEUTRAL and REVERSE.

The same axle 22 supports a disc cam 32 for reverse selection and disc cam 34 with a slot 36 in one circular face for selecting gear 1 and gear 2 and a slot 38 in the opposite circular face for selecting gear 3 and gear 4.

Figures 2, 3:
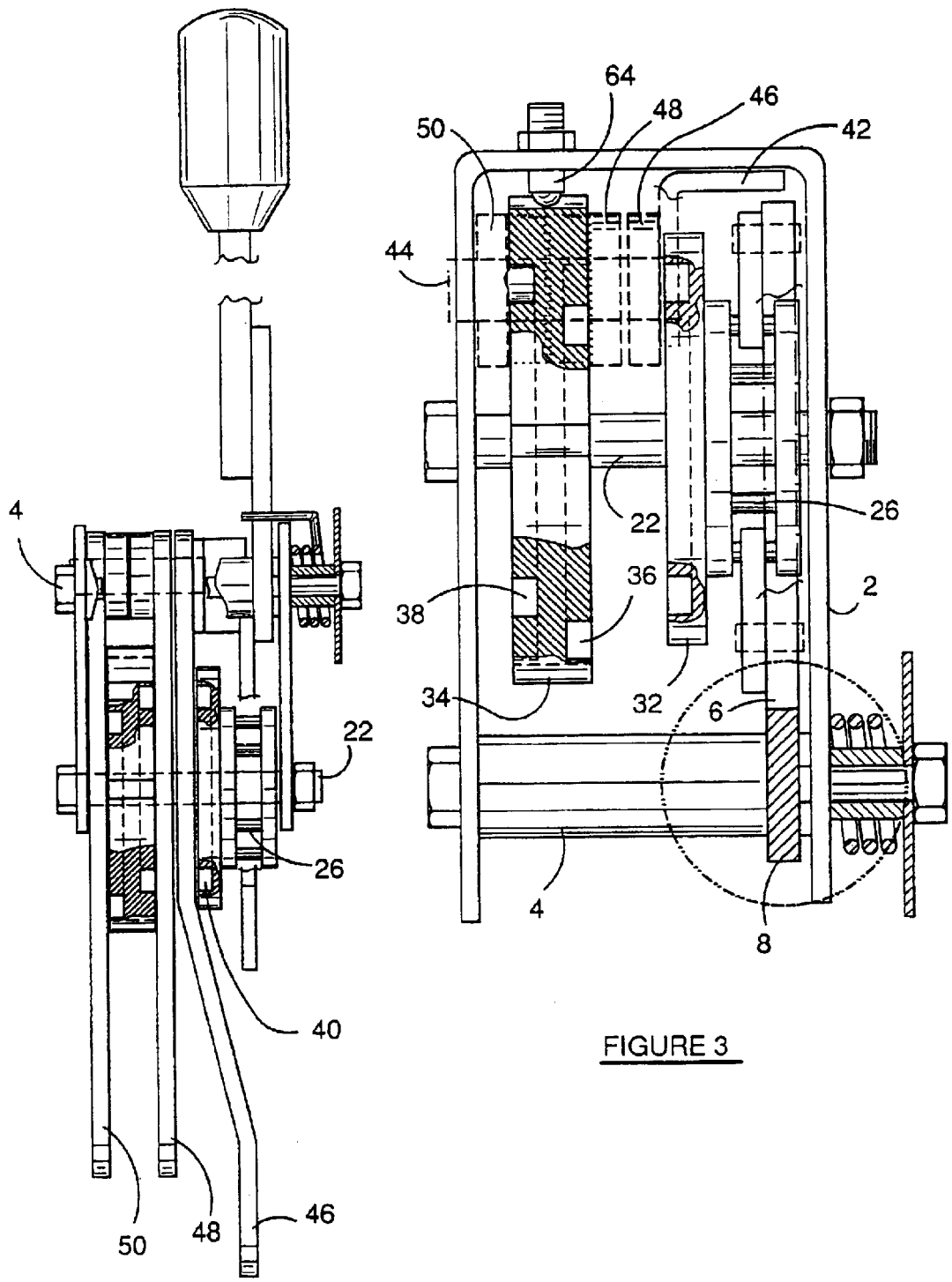
FIG. 2 is a front sectional view.
FIG. 3 is an underneath plan.
Figure 4:
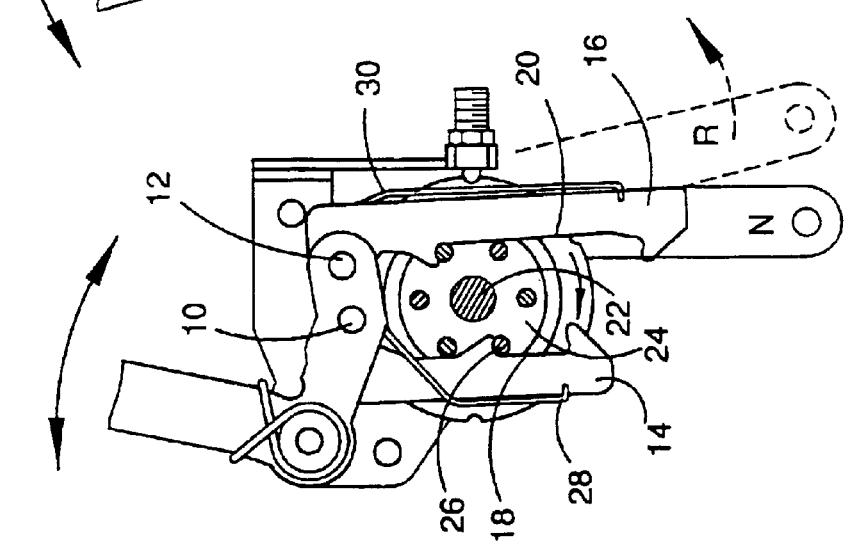
FIGS. 4, 5 and 6 are side views showing the pawl producing movement of the levers.
Figure 5:
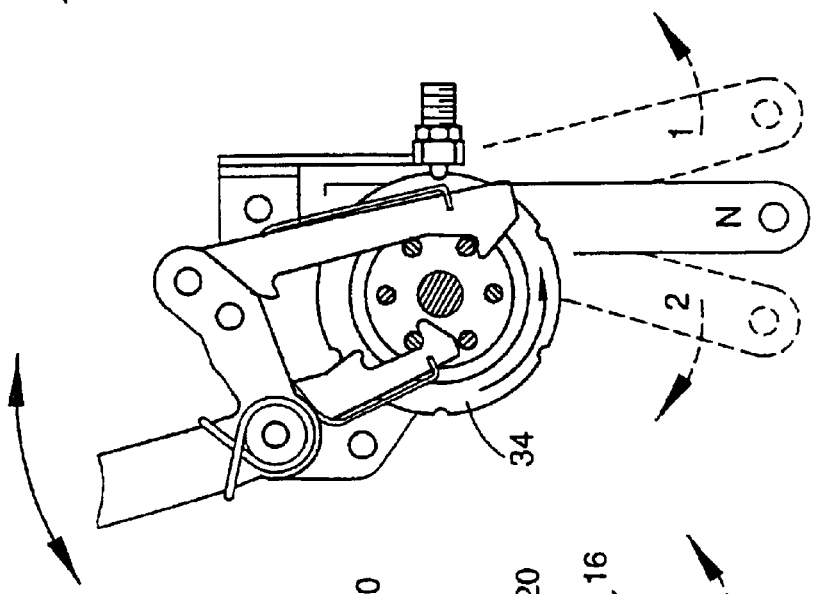
Figure 6:
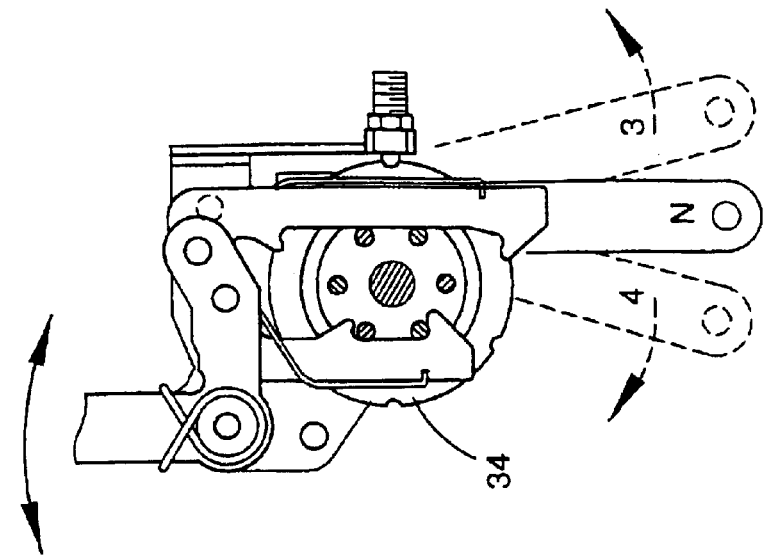

Referring now to FIGS. 3 and 7, disc cam 32 has an arcuate slot 40 in one face. The opposite face abuts the ratchet drum. The body has an internal bracket 42 which supports axle 44 from which depend a REVERSE lever 46, a ½ lever 48 and a ¾ lever 50. In FIG. 10 a lever is shown with a pin 52 which in use rides in the cam slot. Bore 54 is for coupling to a gearbox selector fork (not shown). All three levers act as followers.

Figures 11, 12:
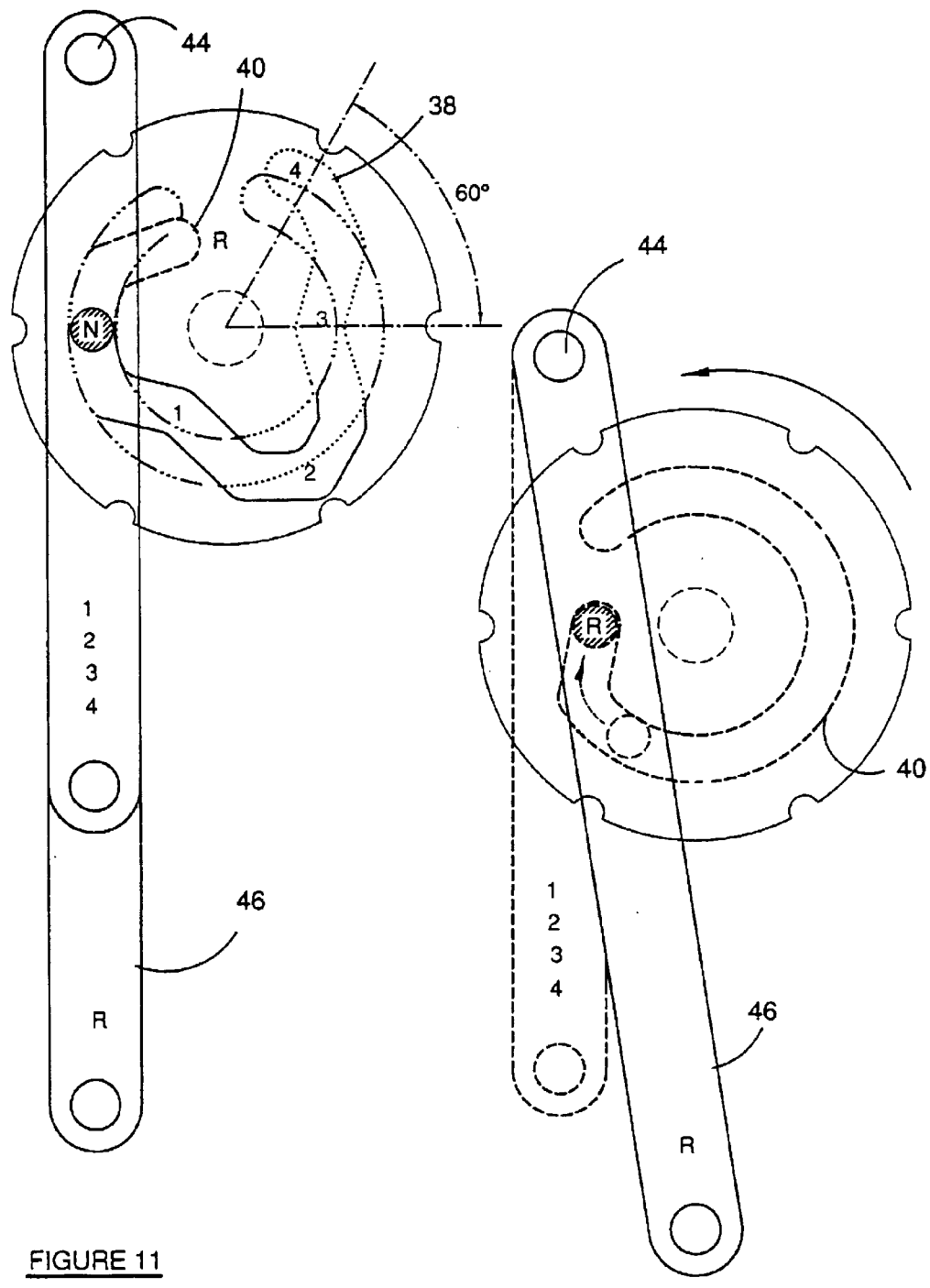
FIG. 11 is a side view showing neutral.
FIG. 12 is a side view showing reverse.

The pin of the reversing lever engages slot 40. The pin of the ½ lever 48 engages slot 36. The pin of ¾ lever 50 engages slot 38. Looking at FIG. 12, the reversing slot is circular except for the end step 56. Accordingly, for most of the movement of the gear lever, the reversing lever remains stationary, but at the end of the gear levers travel, the REVERSE lever tilts and selects REVERSE. In FIG. 11, the circular arcs of all three slots coincide and the levers rest in NEUTRAL.

Figure 13:
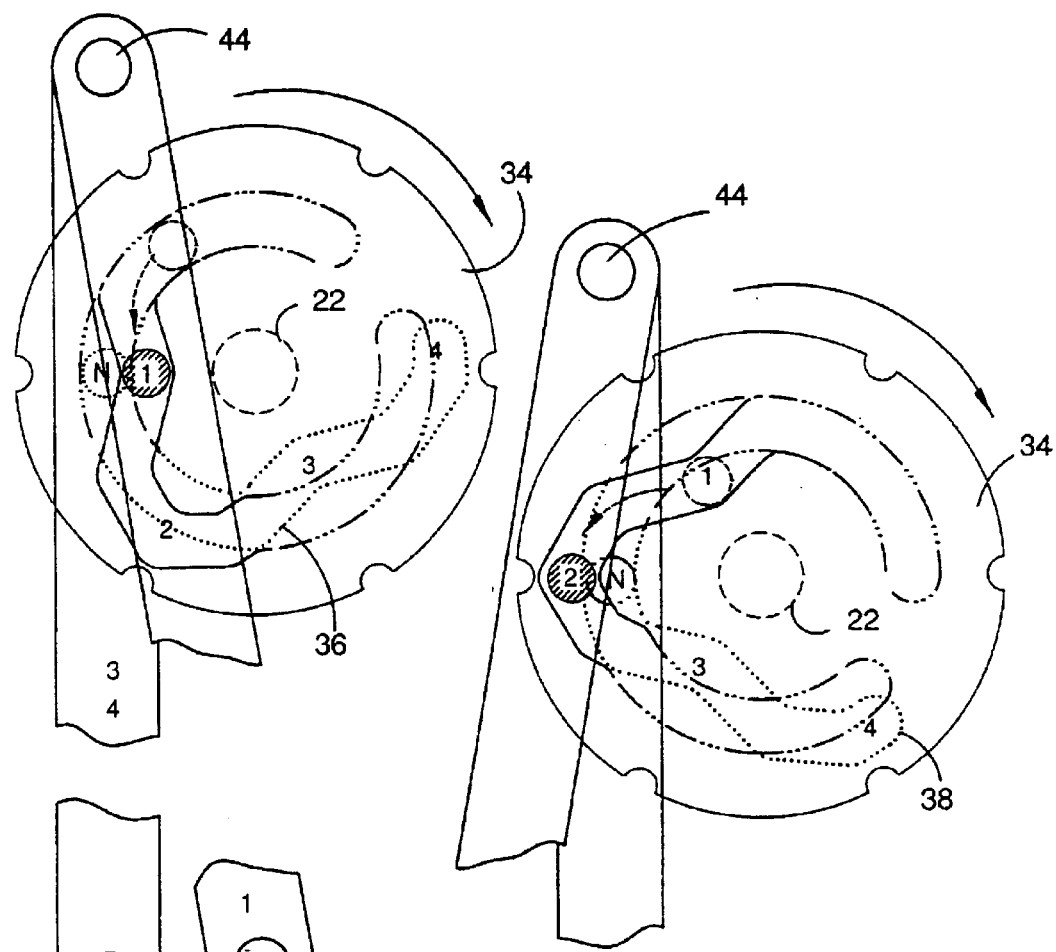
FIG. 13 shows the selection of the first gear.
Figure 14:
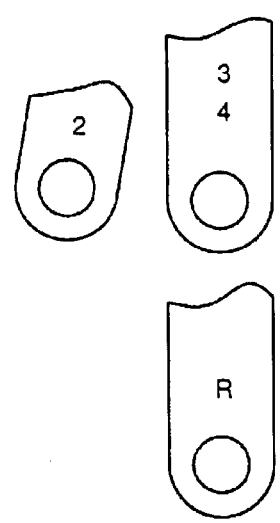
FIG. 14 shows the selection of second gear.
Figures 15, 16:
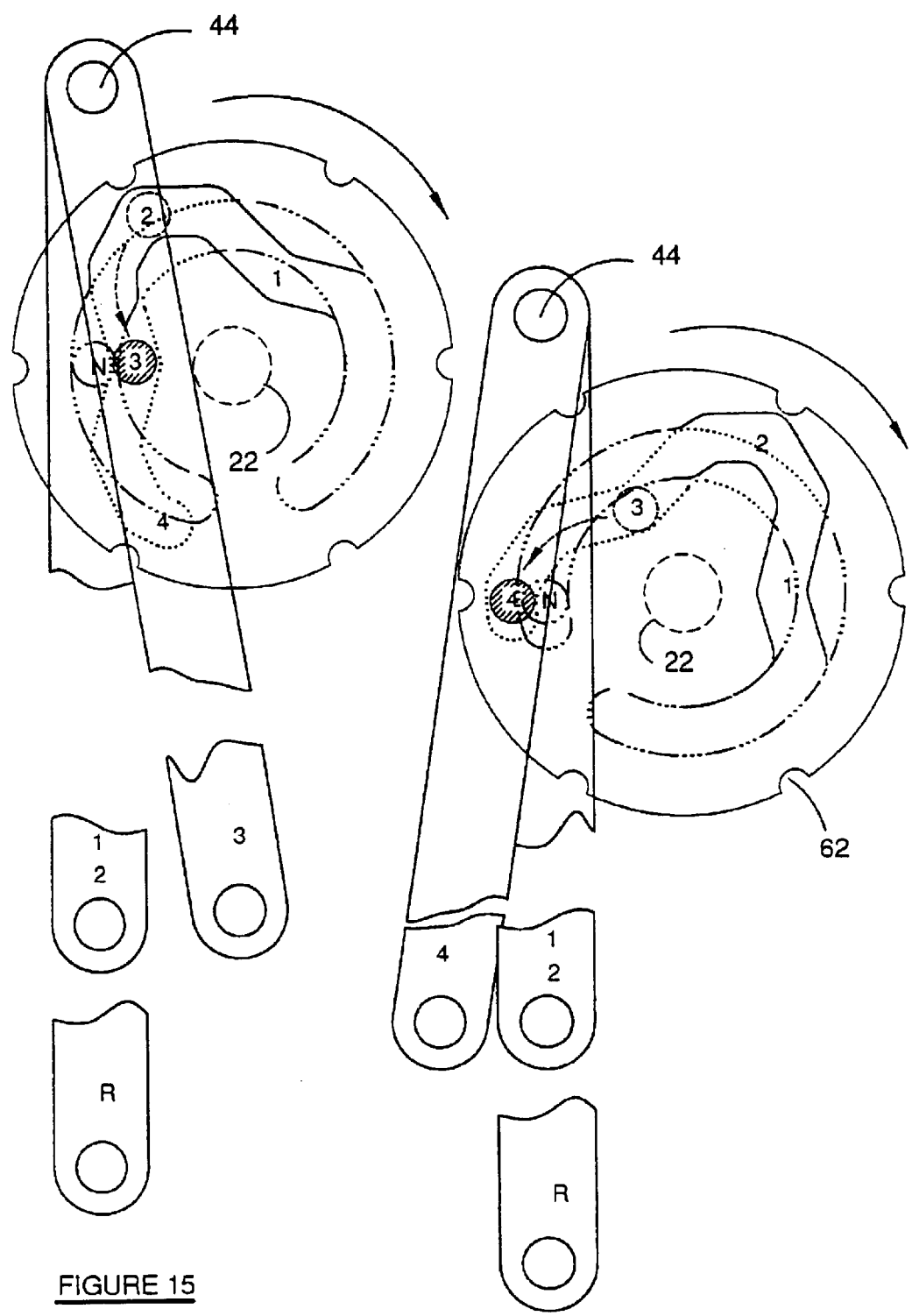
FIG. 15 shows the selection of third gear.
FIG. 16 shows the selection of fourth gear.

In FIGS. 13–15, the slots 36 and 38 are shown superimposed with the blank 56 and peak 58 of both slots in corresponding positions. Rotation of the cam produces different movement in the levers through 240° from NEUTRAL in both levers to ½ and then ¾.

Rotation of the cam from NEUTRAL produces no movement in lever ¾ and the reverse lever for 240° of ratchet rotation during which gear 1 and then gear 2 are selected. The lever ½ remains stationary while lever ¾ moves due to 120° of ratchet rotation. From gear 4, the driver moves down through the gears to recover NEUTRAL. The positions are shown stage wise in FIGS. 11–16. The arrest and dwell of the disc 34 is assisted by the provision of circumferential recesses 62 at 60° intervals by spring loaded detent 64.

The disc cams are made of mild steel which is case hardened after milling. Clearly the mechanism can manage a larger number of gears by the provision of more cams and smaller angular steps.

I have found the advantages of the above embodiment to be:

1. Lost motion is minimised.

2. Small number of working parts, allows a compact mechanism.

3. A substantial proportion of the parts can be laser cut from steel sheet.

Clearly the gearshift is applicable to static installations such as in mining and manufacturing where gear trains utilise selector forks.

What is claimed is:

1. A mechanical gear shifting apparatus capable of connection to a gearbox, the apparatus comprising:

a shifter frame, a shaft having a longitudinal axis and being mounted to the shifter frame in such a way that the shaft is rotatable about said longitudinal axis, a ratchet drum having teeth and being fixed to the shaft, a first cam disc having first and second opposite main faces and a first slot in the first main face, the first cam disc being fixed to the shaft for rotation therewith, a shifting lever connected to the shifter frame and being pivotable about a first axis in first and second opposite directions, first and second engagement means connected to the shifting lever and positioned for engaging the teeth of the ratchet drum, whereby pivotal movement of the shifting lever induces rotational movement of the shaft about the shaft's longitudinal axis, and a first pendant lever having a first end engageable to the gearbox and a first follower engaging the first slot.

2. An apparatus according to claim 1, wherein movement of the shifting lever in said first direction causes the first and second engagement means to engage the teeth of the ratchet drum forcing the ratchet drum, the shaft, and the first cam disc to rotate in a first rotational direction, movement of the shifting lever in said second direction causes the first and second engagement means to engage the teeth of the ratchet drum forcing the ratchet drum, the shaft, and the first cam disc to rotate in a second rotational direction opposite to said first rotational direction, the shifting lever is movable with respect to the shifter frame to a neutral position and at least one non-neutral position, the neutral position of the shifting lever corresponds to a neutral position of the first pendant lever, and at least a first non-neutral position of the shifting lever corresponds to a non-neutral position of the first pendant lever.

3. An apparatus according to claim 2, wherein a second slot is formed in the second main face of the first cam disc and the apparatus further comprises:

a second pendant lever having an end engageable to the gearbox and a second follower engaging the second slot.

4. An apparatus according to claim 3, wherein the shifting lever is movable with respect to the shifter frame to at least two non-neutral positions, the neutral position of the shifting lever corresponds to a neutral position of the second pendant lever, and at least a second non-neutral position of the shifting lever corresponds to a non-neutral position of the second pendant lever.

5. An apparatus according to claim 4, further comprising:

a second cam disc having a third main face and a third slot in the third main face, the second cam disc being fixed to the shaft for rotation therewith, and a third pendant lever having an end engageable to the gearbox and a third follower engaging the third slot.

6. An apparatus according to claim 5, wherein movement of the shifting lever in said first direction causes the second cam disc to rotate in said first rotational direction, movement of the shifting lever in said second direction causes the second cam disc to rotate in said second rotational direction, the shifting lever is movable with respect to the shifter frame to at least three non-neutral positions, the neutral position of the shifting lever corresponds to a neutral position of the third pendant lever, and at least a third non-neutral position of the shifting lever corresponds to a non-neutral position of the third pendant lever.

7. An apparatus according to claim 2, further comprising:

a second cam disc having a second slot in a main face thereof, the second cam disc being fixed to the shaft for rotation therewith, and a second pendant lever having an end engageable to the gearbox and a second follower engaging the second slot.

8. An apparatus according to claim 7, wherein movement of the shifting lever in said first direction causes the second cam disc to rotate in said first rotational direction, movement of the shifting lever in said second direction causes the second cam disc to rotate in said second rotational direction, the shifting lever is movable with respect to the shifter frame to at least two non-neutral positions, the neutral position of the shifting lever corresponds to a neutral position of the second pendant lever, and at least a second non-neutral position of the shifting lever corresponds to a non-neutral position of the second pendant lever.

9. An apparatus according to claim 1, wherein a second slot is formed in the second main face of the first cam disc and the apparatus further comprises;

a second pendant lever having an end engageable to the gearbox and a second follower engaging the second slot.

10. An apparatus according to claim 1, wherein a second slot is formed in the second main face of the first cam disc and the apparatus further comprises:

a second cam disc having a third main face and a third slot in the third main face, the second cam disc being fixed to the shaft for rotation therewith, a second pendant lever having an end engageable to the gearbox and a second follower engaging the second slot, and a third pendant lever having an end engageable to the gearbox and a third follower engaging the third slot.

11. An apparatus according to claim 1, further comprising:

a second cam disc having a second slot in a main face thereof, the second cam disc being fixed to the shaft for rotation therewith, and a second pendant lever having an end engageable to the geaxbox and a second follower engaging the second slot.

12. An apparatus according to claim 1, wherein the first engagement means is a first pawl, the second engagement means is a second pawl, the first pawl acts as a feed pawl on the ratchet drum, the second pawl acts as an arrester on the ratchet drum, and the first and second pawls rock like an escapement in response to movement of the shifting lever.

13. An apparatus according to claim 12, wherein the teeth of the ratchet drum are spaced a first distance apart, the first pawl comprises two feed hooks, the feed hooks are separated from one another by the first distance, the second pawl comprises two arrester hooks, the arrester hooks are separated by a second distance, and the second distance is greater than the first distance.

14. An apparatus according to claim 1, wherein the teeth of the ratchet drum are arranged equiangularly in a circular pattern centered around the shaft's longitudinal axis.

15. An apparatus according to claim 1, wherein the shifting lever is connected to the shifter frame by an axle having a first axis that is mounted to the shifter frame for rotation about said first axis.

16. An apparatus according to claim 15, wherein the axle constrains the shifting lever against movement other than pivotal movement about the first axis.

17. An apparatus according to claim 1, wherein the first pendant lever has a second end at which the first pendant lever is pivoted to the shifter frame.

* * * * *